US012693818B2

(12) United States Patent
Mizuno

(10) Patent No.: US 12,693,818 B2
(45) Date of Patent: Jul. 28, 2026

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Tomohiro Mizuno, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/180,915

(22) Filed: Mar. 9, 2023

(65) Prior Publication Data

US 2024/0086126 A1     Mar. 14, 2024

(30) Foreign Application Priority Data

Sep. 13, 2022     (JP) ................................. 2022-145629

(51) Int. Cl.
*G06F 3/12* (2006.01)
(52) U.S. Cl.
CPC .......... *G06F 3/1256* (2013.01); *G06F 3/1208* (2013.01)
(58) Field of Classification Search
CPC .... G06F 3/1256; G06F 3/1208; G06F 3/1258; G06F 3/1255; G06F 3/1205; G06F 3/1285
See application file for complete search history.

(56) References Cited

U.S. PATENT DOCUMENTS

| | | | | |
|---|---|---|---|---|
| 2016/0165091 A1* | 6/2016 | Ooba | .................... | G06F 3/1204 |
| | | | | 358/1.15 |
| 2017/0279997 A1* | 9/2017 | Ozawa | ................. | H04N 1/0044 |
| 2019/0107937 A1* | 4/2019 | Morita | ................. | G06F 3/0482 |
| 2020/0304660 A1* | 9/2020 | Shen | ................. | H04N 1/00477 |
| 2020/0374409 A1* | 11/2020 | Kashiwagi | ......... | H04N 1/00204 |
| 2020/0409517 A1* | 12/2020 | Nakanishi | ................ | G06T 3/60 |
| 2023/0244419 A1* | 8/2023 | Kanazawa | ............ | G06F 3/1205 |
| | | | | 358/1.15 |
| 2023/0359416 A1* | 11/2023 | Yamada | ................ | G06F 3/1204 |

FOREIGN PATENT DOCUMENTS

| | | |
|---|---|---|
| JP | 2006-340220 A | 12/2006 |
| JP | 2010-243706 A | 10/2010 |

\* cited by examiner

*Primary Examiner* — Iriana Cruz
(74) *Attorney, Agent, or Firm* — Oliff PLC

(57) ABSTRACT

An information processing apparatus includes a processor configured to: receive an output instruction to apply a preset setting to a job for output; and, when a setting user is different from an instruction user, the setting user presetting the preset setting, the instruction user transmitting the output instruction, display an output result of the job before output of the job, the output result being obtained if the preset setting is applied.

9 Claims, 9 Drawing Sheets

16

Use a setting different from the selected setting.

FIG. 9

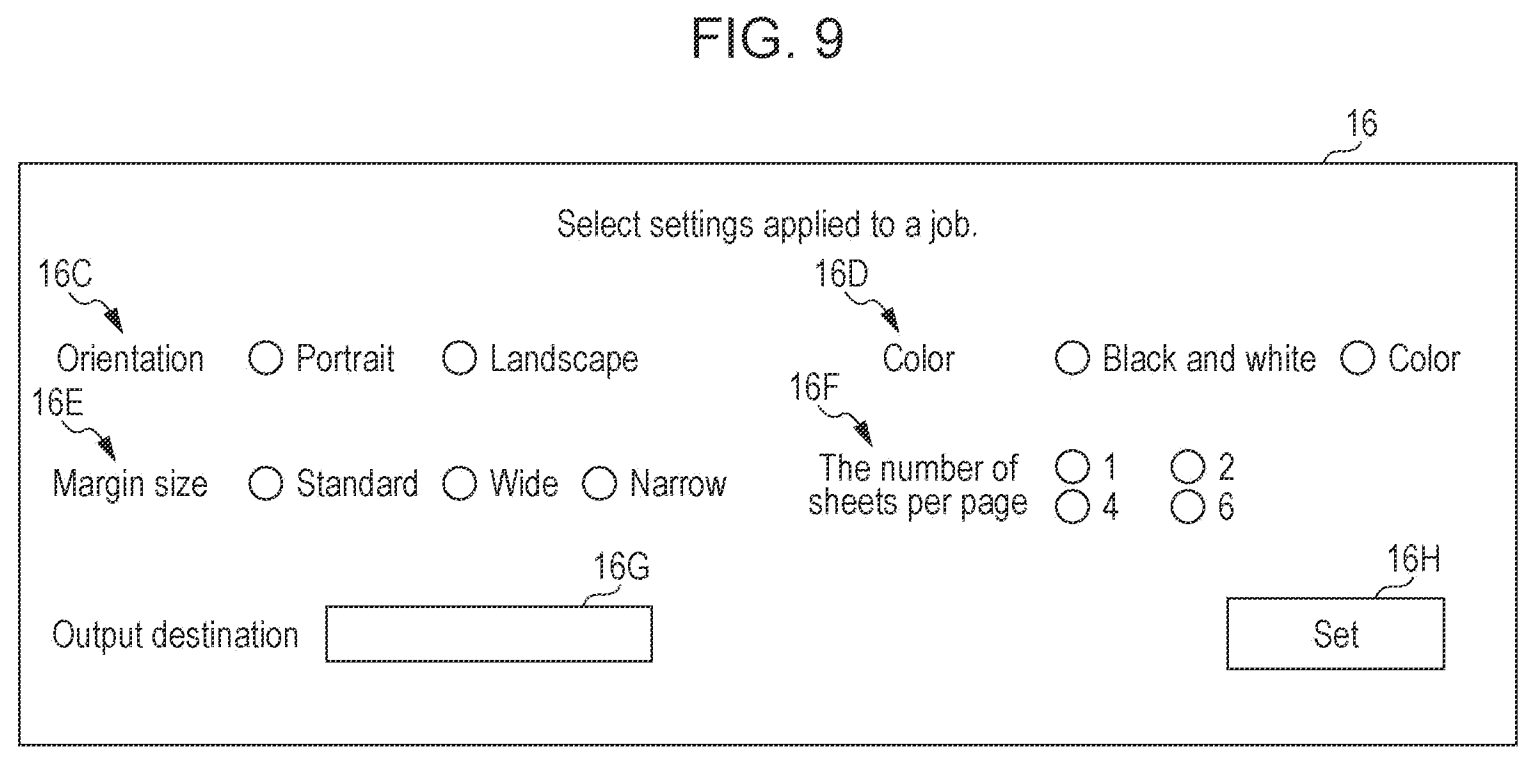

Select settings applied to a job.

16

16C
Orientation    ◯ Portrait    ◯ Landscape

16E
Margin size    ◯ Standard    ◯ Wide    ◯ Narrow

16D
Color    ◯ Black and white    ◯ Color

16F
The number of    ◯ 1    ◯ 2
sheets per page    ◯ 4    ◯ 6

16G
Output destination [          ]

16H
[ Set ]

Change the size of output material from A4
to another setting value.

◯ A3        ◯ B5        ◯ A5

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-145629 filed Sep. 13, 2022.

BACKGROUND

(i) Technical Field

The present disclosure relates to an information processing apparatus, a non-transitory computer readable medium, and an information processing method.

(ii) Related Art

Japanese Unexamined Patent Application Publication No. 2010-243706 discloses an image forming apparatus which includes a display unit for displaying various types of information. The image forming apparatus has a printing function and a preview function of displaying, on a display screen of the display unit, a finished image of printed matter prior to output of the printed matter obtained through execution of the printing function. The image forming apparatus includes an operation-information acquisition unit and a setting-mistake-information collecting unit. The operation-information acquisition unit acquires operation information for performing selection or setting on items of various functions related to image formation. The setting-mistake-information collecting unit collects setting-mistake information, which indicates whether a setting mistake is highly likely to be present, in association with each of the various functions related to image formation. The image forming apparatus also includes a preview-candidate storage unit which stores, as a target candidate of the preview function, a function, among the various functions, which is determined to be highly likely to have a setting mistake, on the basis of the setting-mistake information collected by the setting-mistake-information collecting unit. The image forming apparatus also includes a display controller which, when a function in the operation information is determined to be a preview candidate, displays, on the display screen, a screen illustrating a finished image of printed matter which reflects the function in the operation information.

Japanese Unexamined Patent Application Publication No. 2006-340220 discloses an image processing apparatus including a display unit and a preview display controller which displays, on the display unit, a preview of an image that is to be processed. The preview display controller controls whether the preview display of the image that is to be processed is to be automatically performed, through determination as to whether a predetermined condition is satisfied.

Output of a job using a setting, which has been preset by another user, causes a problem whether it is uncertain whether the job is output as intended.

SUMMARY

Aspects of non-limiting embodiments of the present disclosure relate to an information processing apparatus, a non-transitory computer readable medium, and an information processing method which, even in output of a job using a setting which has been preset by another user, enable whether the job is output as intended, to be checked in advance.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising: a processor configured to: receive an output instruction to apply a preset setting to a job for output; and, when a setting user is different from an instruction user, the setting user presetting the preset setting, the instruction user transmitting the output instruction, display an output result of the job before output of the job, the output result being obtained if the preset setting is applied.

BRIEF DESCRIPTION OF THE DRAWINGS

Exemplary embodiments of the present disclosure will be described in detail based on the following figures, wherein:

FIG. 9 is a schematic diagram illustrating an exemplary setting screen according to an exemplary embodiment;

FIG. 12 is a schematic diagram illustrating an exemplary change screen according to the second exemplary embodiment.

DETAILED DESCRIPTION

First Exemplary Embodiment

Figure 1:
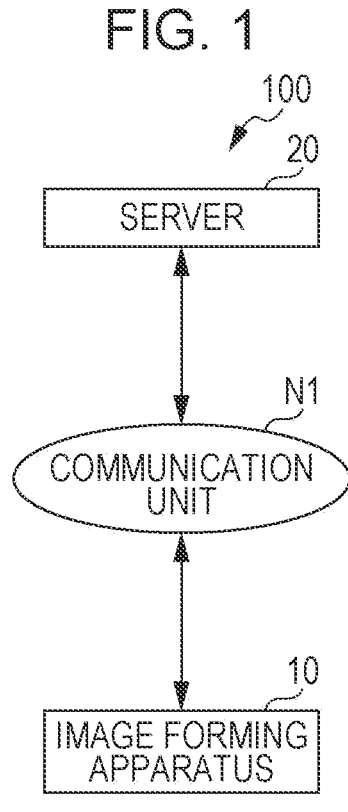
FIG. 1 is a schematic diagram illustrating an exemplary hardware configuration of an information processing system according to an exemplary embodiment.

An exemplary embodiment of the present disclosure will be described below by referring to the drawings. In the drawings, the same or equivalent components and parts are designated with the same reference numerals. The dimensional ratios in the drawings are exaggerated for convenience of description, and may be different from the actual ratios.

As illustrated in FIG. 1, an information processing system 100 according to a first exemplary embodiment includes an image forming apparatus 10 serving as an exemplary information processing apparatus, and a server 20.

The image forming apparatus 10 is capable of communicating with the server 20 through a communication unit N1. In the first exemplary embodiment, the communication unit N1 is an in-house communication line, such as a local area network (LAN) or a wide area network (WAN). However, the configuration is not limited to this example. For example, the communication unit N1 may be a public communication line, such as the Internet or a telephone line, or a combination of an in-house communication line and a public communication line. In the first exemplary embodiment, the communication unit N1 is a wireless communication line. Alternatively, the communication unit N1 may be a wired communication line or a combination of wired and wireless communication lines.

Figure 2:
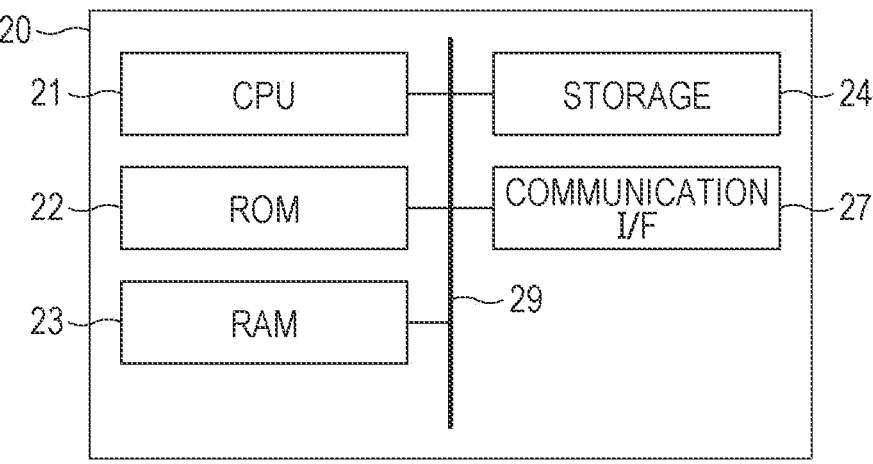
FIG. 2 is a block diagram illustrating an exemplary hardware configuration of a server according to an exemplary embodiment.

As illustrated in FIG. 2, the server 20 includes configurations of a central processing unit (CPU) 21, a read only memory (ROM) 22, a random access memory (RAM) 23, a storage 24, and a communication interface (UF) 27. The configurations are communicatively connected to each other through a bus 29.

The CPU 21, which is a central processing unit, runs various programs, and controls the units. That is, the CPU 21 reads programs from the ROM 22 or the storage 24, and runs programs by using the RAM 23 as a work area. According to programs stored in the ROM 22 or the storage 24, the CPU 21 controls the configurations and performs various computations.

The ROM 22 stores various programs and various types of data. The RAM 23 serves as a work area which temporality stores programs or data. The storage 24, which is formed of a storage device, such as a hard disk drive (HDD) or a solid state drive (SSD), stores various programs, including an operating system, and various types of data. In the first exemplary embodiment, the storage 24 stores, in association with each other, settings, which are applicable to a job which is output by the image forming apparatus 10, identification information for identifying setting users who have preset the settings, and a setting screen, which is associated with the settings.

The communication OF 27, which is an interface for communicating with other devices such as the image forming apparatus 10, employs standards, such as Ethernet™, fiber distributed data interface (FDDI), and wireless fidelity (Wi-Fi)™.

In the first exemplary embodiment, an image forming apparatus is used as an exemplary information processing apparatus. However, the configuration is not limited to this example. Instead of an image forming apparatus, any apparatus which performs information processing may be used. The information processing includes, for example, performing printing using character data, image data, or the like, generating or processing data by using facilities included in an information processing apparatus, and receiving/transmitting data between an information processing apparatus and another device.

Figure 3:
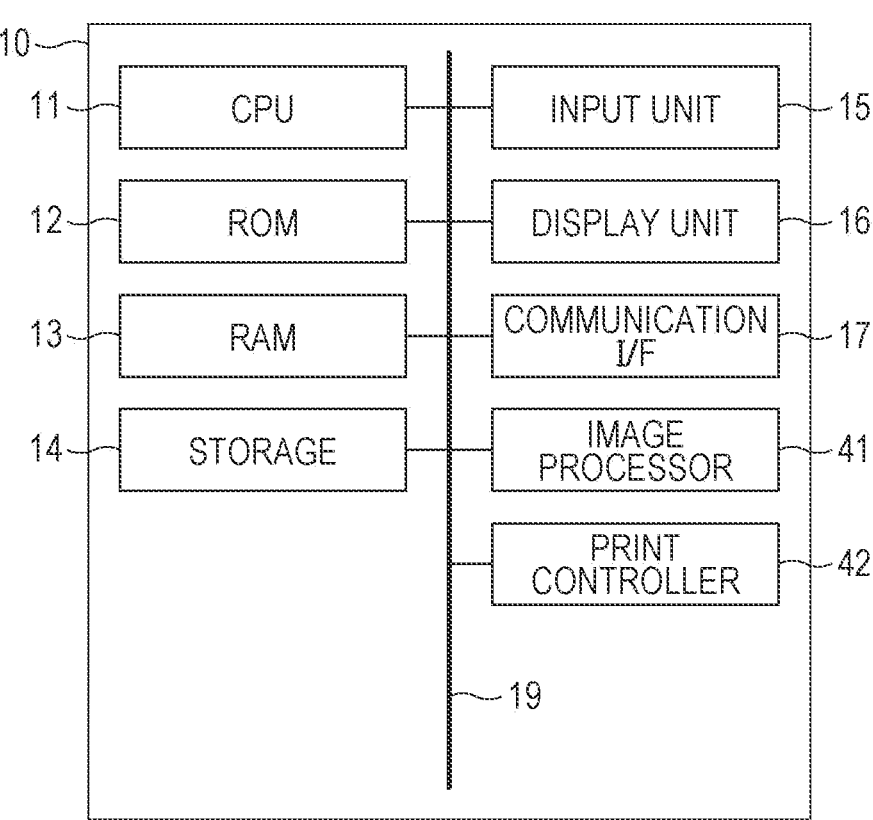
FIG. 3 is a block diagram illustrating an exemplary hardware configuration of an image forming apparatus according to an exemplary embodiment.

As illustrated in FIG. 3, the image forming apparatus 10 includes configurations of a CPU 11, a ROM 12, a RAM 13, a storage 14, an input unit 15, a display unit 16, a communication OF 17, an image processor 41, and a print controller 42. The configurations are communicatively connected to each other through a bus 19.

The CPU 11, which is a central processing unit, runs various programs, and controls the units. That is, the CPU 11 reads programs from the ROM 12 or the storage 14, and runs programs by using the RAM 13 as a work area. According to programs stored in the ROM 12 or the storage 14, the CPU 11 controls the configurations and performs various computations. In the first exemplary embodiment, the ROM 12 or the storage 14 stores an information processing program.

The ROM 12 stores various programs and various types of data. The RAM 13 serves as a work area which temporality stores programs or data. The storage 14, which is formed of a storage device, such as an HDD or an SSD, stores various programs, including an operating system, and various types of data.

The input unit 15, which includes a pointing device such as a mouse and a keyboard, is used to perform various types of input.

The display unit 16, which is, for example, a liquid-crystal display, displays various types of information. The display unit 16, which employs a touch panel system, may function as the input unit 15.

The communication OF 17, which is an interface for communicating with other devices such as the server 20, employs standards, such as Ethernet™, FDDI, and Wi-Fi™.

The image processor 41 performs various types of image processing. For example, the print controller 42 performs image formation, detection of a sheet fed on a tray, and transport of a sheet.

Figure 4:
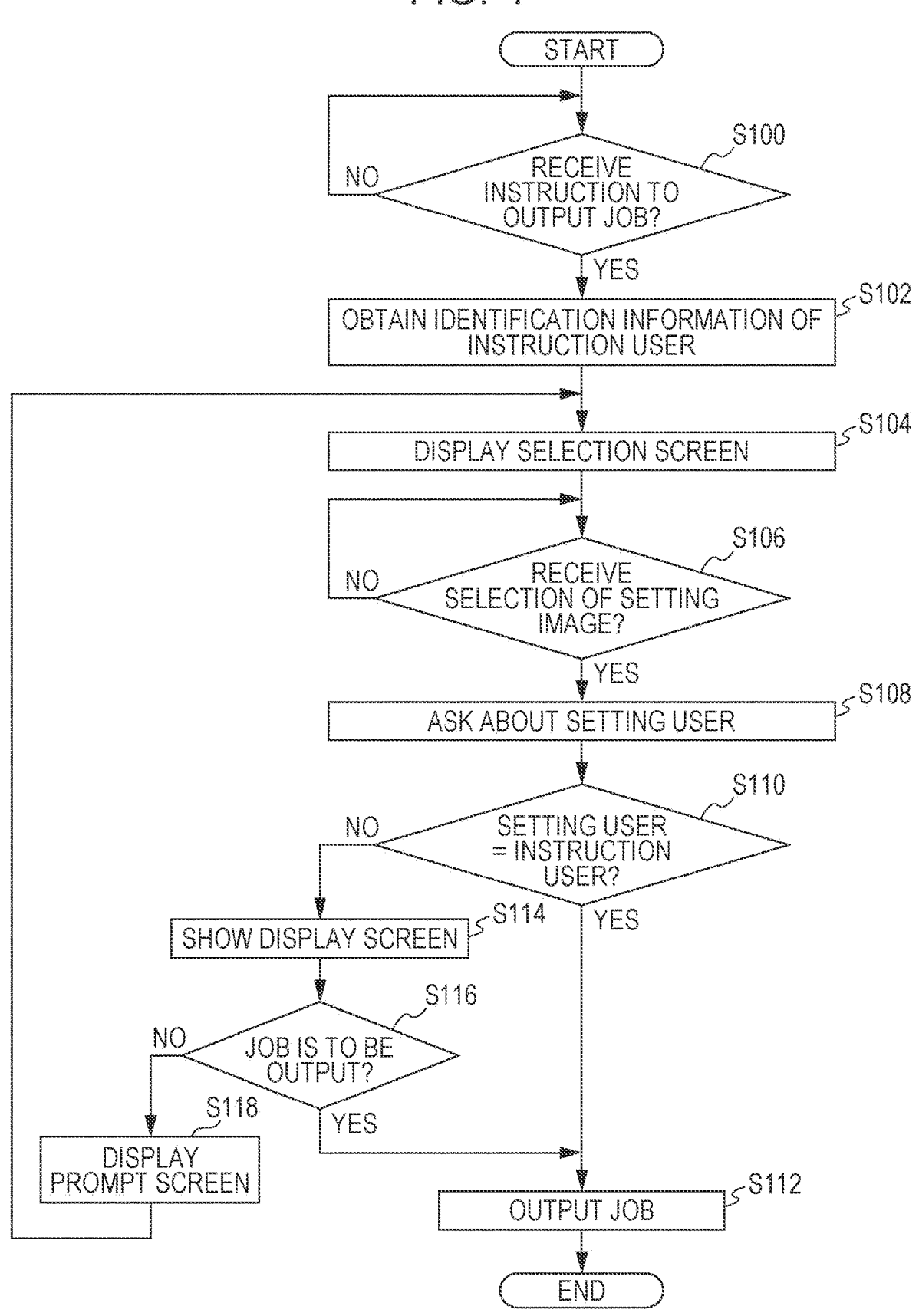
FIG. 4 is a flowchart of exemplary information processing performed by an image forming apparatus according to a first exemplary embodiment.

Referring to FIG. 4, the flow of information processing performed by the image forming apparatus 10 according to the first exemplary embodiment will be described. The information processing is performed by the CPU 11 reading the information processing program from the ROM 12 or the storage 14 and loading the information processing program on the RAM 13 for execution.

In step S100 in FIG. 4, the CPU 11 waits until an output instruction to output a job is received. If the CPU 11 receives an instruction to output a job (YES in step 100), the process proceeds to step S102.

In step S102, the CPU 11 obtains identification information for identifying an instruction user who has transmitted the output instruction. In the first exemplary embodiment, the identification information is, for example, the employee number of a user, a telephone number of a user, or a mail address of a user.

In step S104, the CPU 11 displays, on the display unit 16, a selection screen according to a predetermined format.

Figure 5:
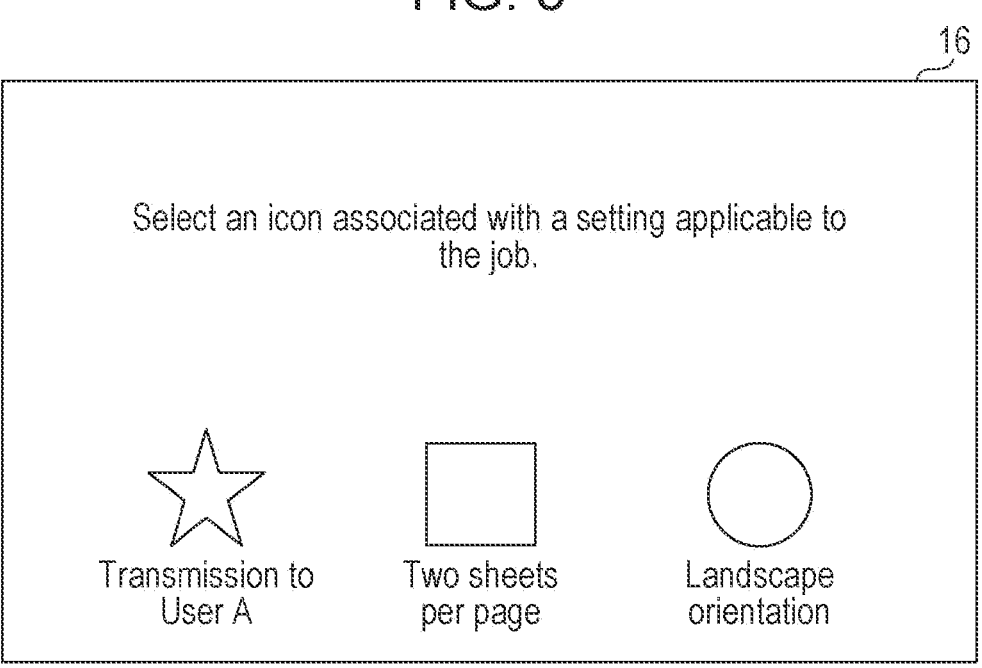
FIG. 5 is a schematic diagram illustrating an exemplary selection screen according to an exemplary embodiment.

As illustrated in FIG. 5, a message for prompting a selection of an icon as a setting image associated with a setting applicable to the job, and setting images are displayed on the selection screen according to the first exemplary embodiment. The instruction user selects, by using the input unit 15, a setting image (in the example in FIG. 5, a star-shaped image, a rectangular image, or a circular image) displayed on the selection screen. In the first exemplary embodiment, as illustrated in FIG. 5, settings applicable to the job are a setting of transmitting, to user A, an output job (hereinafter referred to as an "output material"), a setting of outputting a two-sheet job allocated to each single page, and a setting of outputting a job in the landscape orientation. However, the configuration is not limited this example. For example, settings applicable to a job may include a setting of outputting a job in black and white, a setting of outputting a job in color, a setting of outputting a job enlarged or reduced in size, and a setting of relatively increasing or decreasing the size of the margin of output material. The settings applicable to a job and the setting images are preset in a preliminary process described below.

As illustrated in FIG. 5, on the selection screen according to the first exemplary embodiment, different setting images for the respective settings applicable to a job are displayed. However, the configuration is not limited to this example. On the selection screen according to the first exemplary embodiment, an identical setting image may be displayed regardless of settings applicable to a job.

In step S106, the CPU 11 waits until a selection of any setting image, which is performed by using the input unit 15 on the selection screen, is received. If the CPU 11 receives a selection of any setting image (YES in step 106), the process proceeds to step S108. In the description below, a setting image, of which a selection is received by the CPU 11 in step S106, is referred to as a selected image; a setting associated with the selected image is referred to as a selected setting.

In step S108, the CPU 11 asks the server 20 about a setting user who has preset the selected setting, and receives identification information for identifying the setting user.

In step S110, the CPU 11 determines whether the setting user and the instruction user are the same. Specifically, the CPU 11 determines whether the identification information of the setting user, which has been received in step S108, is the same as that of the instruction user, which has been obtained in step S102. If the setting user and the instruction user are the same (YES in step 110), the CPU 11 proceeds to step S112. In contrast, if the setting user is different from the instruction user (NO in step 110), the CPU 11 proceeds to step S114.

In step S112, the CPU 11 outputs the job to which the selected setting has been applied, and ends the information processing.

In step S114, the CPU 11 displays, on the display unit 16, a display screen according to a predetermined format.

Figure 6:
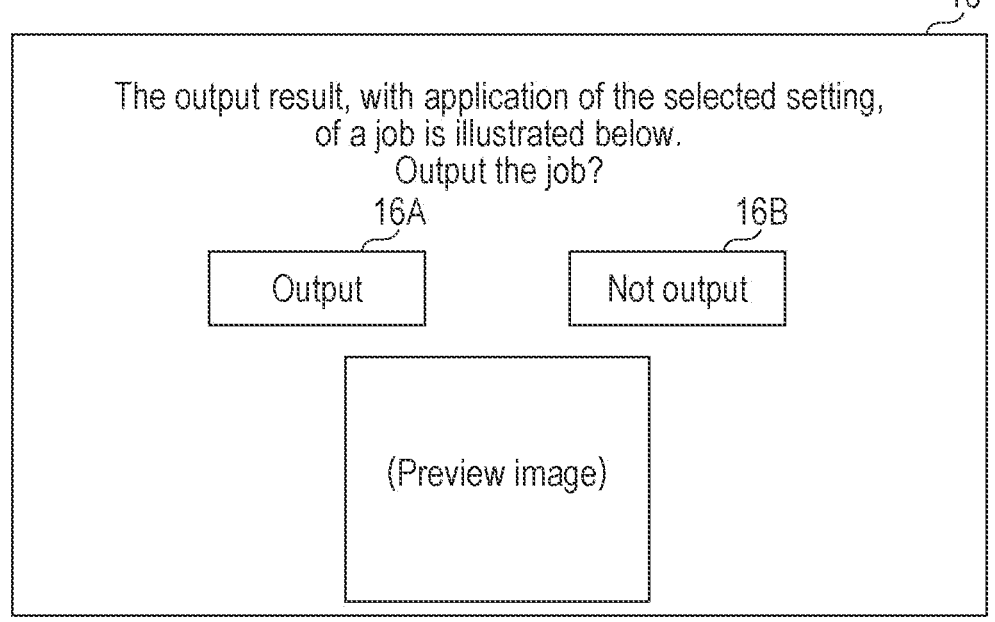
FIG. 6 is a schematic diagram illustrating an exemplary display screen according to an exemplary embodiment.

As illustrated in FIG. 6, a message for prompting a selection as to whether the job is to be output, and an output result (preview image) of the job, which is obtained if the selected setting is applied, are displayed on the display screen according to the first exemplary embodiment. If the job is to be output, the instruction user selects an "Output" button 16A by using the input unit 15; if the job is not to be output, the instruction user selects a "Not output" button 16B.

In step S116, the CPU 11 determines whether a selection to output the job has been received. Specifically, the CPU 11 determines whether a selection of the "Output" button 16A has been received on the display screen. If a selection to output the job has been received (YES in step 116), the CPU 11 proceeds to step S112. In contrast, if a selection not to output the job has been received (NO in step 116), the CPU 11 proceeds to step S118.

In step S118, the CPU 11 displays, on the display unit 16, a prompt screen according to a predetermined format, and returns to step S104.

Figures 7, 8:
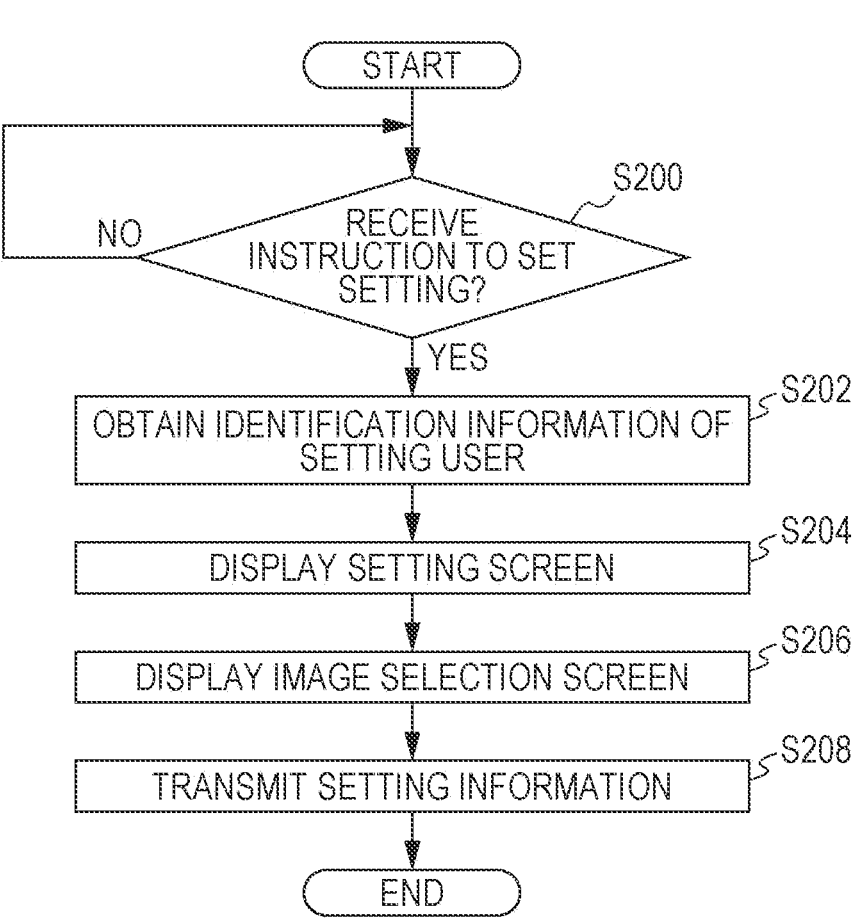
FIG. 7 is a schematic diagram illustrating an exemplary prompt screen according to the first exemplary embodiment.
FIG. 8 is a flowchart of an exemplary preliminary process performed by an image forming apparatus according to an exemplary embodiment.

As illustrated in FIG. 7, a message for prompting application of a preset setting, which is different from the selected setting and which is applicable to the job, is displayed on the prompt screen according to the first exemplary embodiment.

Referring to FIG. 8, the flow of a preliminary process performed by the image forming apparatus 10 according to the first exemplary embodiment will be described.

In step S200 in FIG. 8, the CPU 11 waits until an instruction to preset a setting applied to a job is received. If the CPU 11 receives an instruction to preset a setting applied to a job (YES in step 200), the CPU 11 proceeds to step S202.

In step S202, the CPU 11 obtains identification information for identifying a user (that is, a setting user) who has transmitted the instruction to preset a setting applied to a job.

In step S204. the CPU 11 displays, on the display unit 16, a setting screen according to a predetermined format.

As illustrated in FIG. 9, on the setting screen according to the first exemplary embodiment, a message for prompting a selection of settings applied to a job is displayed. On the setting screen according to the first exemplary embodiment, a selection field 16C for selecting the orientation of output material, a selection field 16D for selecting the color of output material, a selection field 16E for selecting the size of the margin of output material, and a selection field 16F for selecting the number of jobs allocated to each single page are displayed. On the setting screen according to the first exemplary embodiment, an input field 16G for inputting the output destination of output material is displayed. When the setting screen is displayed on the display unit 16, the setting user performs, by using the input unit 15, selection or input in at least one of the fields, the selection field 16C to the selection field 16F and the input field 16G. Then, the setting user selects a "Set" button 16H.

In step S206, the CPU 11 displays, on the display unit 16, an image selection screen according to a predetermined format.

Figure 10:
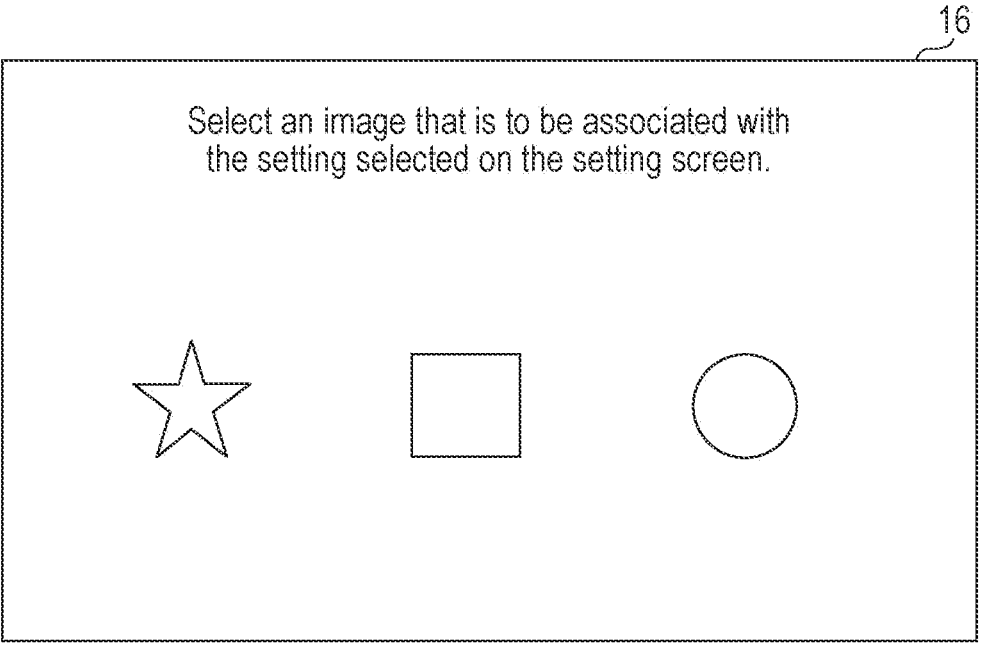
FIG. 10 is a schematic diagram illustrating an exemplary image selection screen according to an exemplary embodiment.

As illustrated in FIG. 10, on the image selection screen according to the first exemplary embodiment, a message for prompting a selection of an image (that is, a setting image) associated with the setting selected on the setting screen is displayed. The setting user selects, by using the input unit 15, any of the images (in the example in FIG. 10, a star-shaped image, a rectangular image, or a circular image) displayed on the image selection screen.

On the image selection screen according to the first exemplary embodiment, images, which have been already associated with preset settings, are not displayed. Therefore, the CPU 11 receives, from a setting user, a setting image selected from the images which have no association with the preset settings. However, the configuration is not limited to this example. The CPU 11 may receive, from a setting user, a setting image selected from images including those having association with the preset settings.

In step S208, the CPU 11 transmits, to the server 20, identification information of the setting user, the setting which has been set by the setting user, and the setting image associated with the setting, and ends the preliminary process. The server 20, which receives these types of information, stores the information in the storage 24.

Second Exemplary Embodiment

In the first exemplary embodiment, when the CPU 11 receives a selection not to output a job, the CPU 11 displays a message for prompting application of a preset setting different from the selected setting. A second exemplary embodiment is different from the first exemplary embodiment in that, when the CPU 11 receives a selection not to output a job, the CPU 11 receives a change of the setting value of the selected setting. This will be described in detail below.

The hardware configurations of the information processing system 100, the image forming apparatus 10, and the server 20 according to the second exemplary embodiment are the same as those (see FIGS. 1, 2, and 3) according to the first exemplary embodiment, and will not be described.

Figure 11:
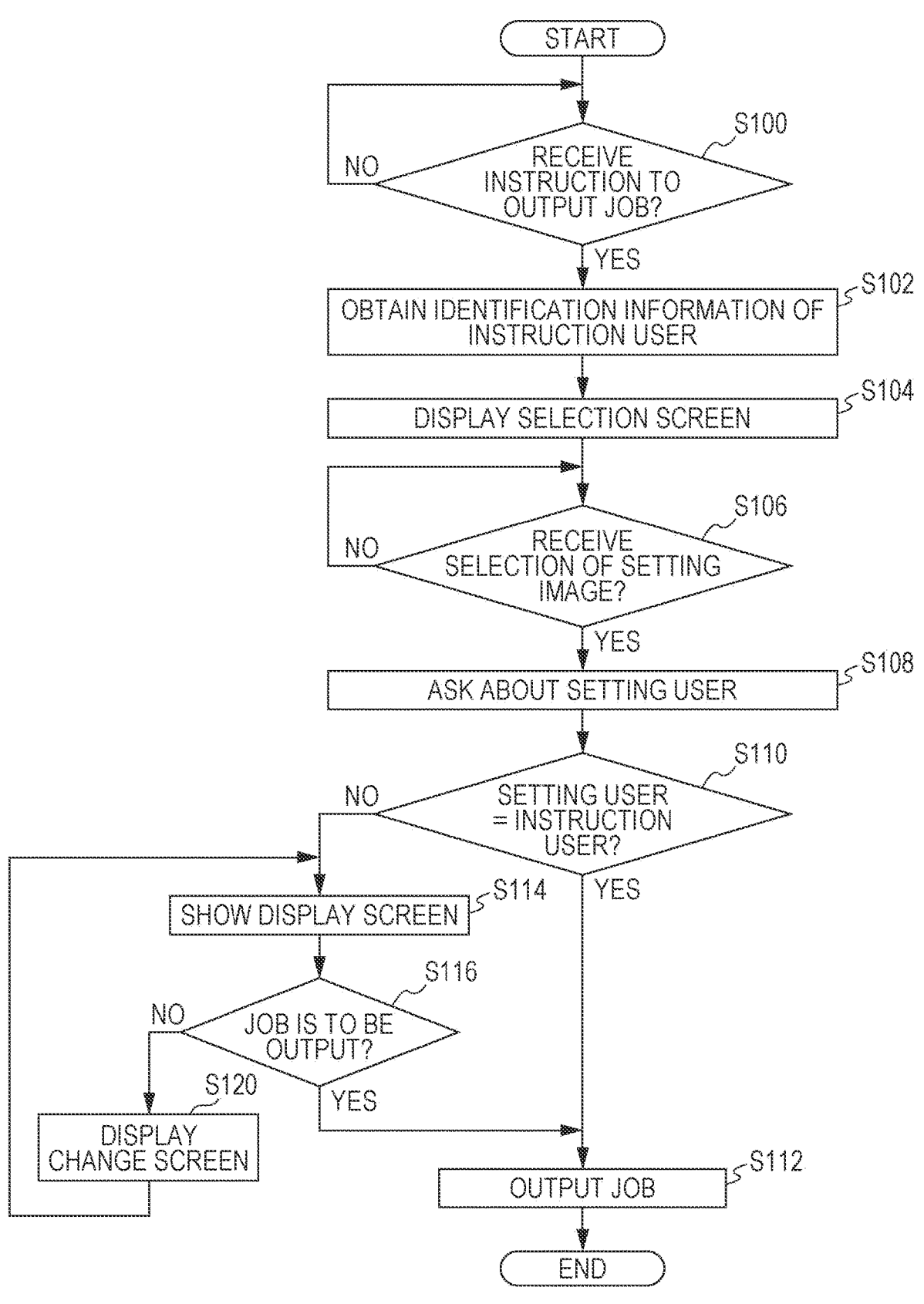
FIG. 11 is a flowchart of exemplary information processing performed by an image forming apparatus according to a second exemplary embodiment.

Referring to FIG. 11, the flow of information processing performed by the image forming apparatus 10 according to the second exemplary embodiment will be described. The information processing is performed by the CPU 11 reading the information processing program from the ROM 12 or the storage 14 and loading the information processing program on the RAM 13 for execution.

The information processing in FIG. 11 is different from that in FIG. 4 in that, instead of step S118, step S120 is used.

In step S120, the CPU 11 displays, on the display unit 16, a change screen according to a predetermined format, and returns to step S114.

Figure 12:
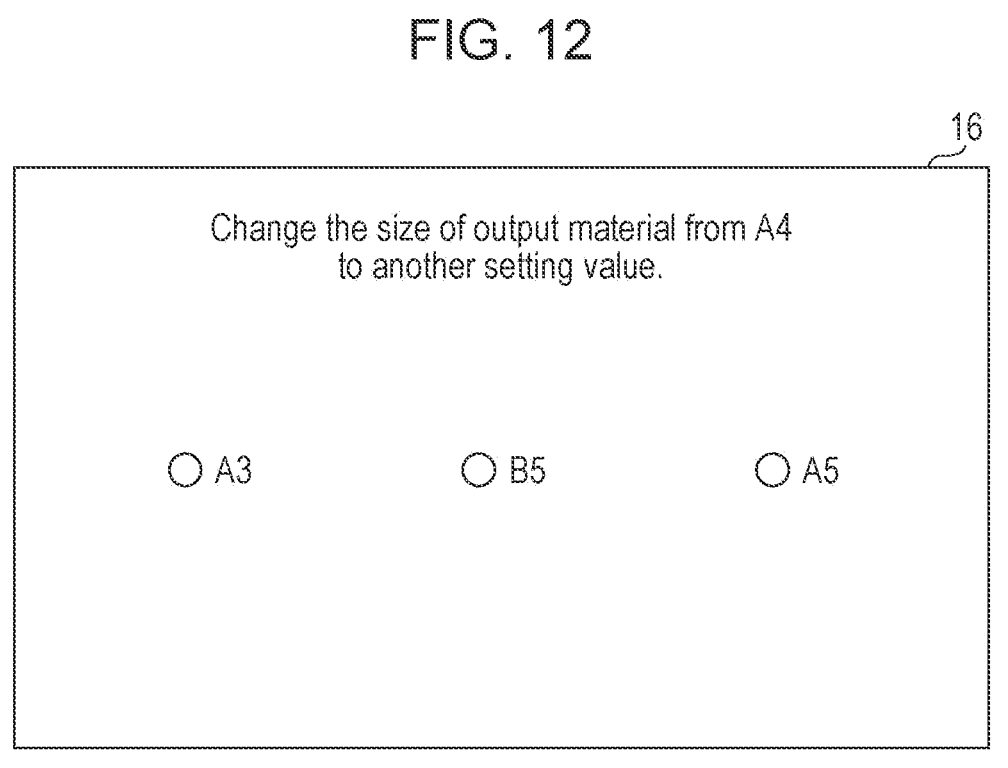

As illustrated in FIG. 12, in the change screen according to the second exemplary embodiment, a message for prompting a change of the setting value of the selected setting (in the example in FIG. 12, the setting of A4 size for output material) is displayed. When the change screen is displayed, the instruction user selects, by using the input unit 15, a setting value (in the example in FIG. 12, A3, B5, or A5) used after a change of the selected setting. For example, when the selected setting indicates output of a job in the landscape orientation, the setting of outputting a job in the portrait orientation is displayed on the change screen. For example, when the selected setting indicates output of a two-sheet job allocated to each single page, the setting of outputting a four-sheet job allocated to each single page, the setting of outputting a six-sheet job allocated to each single page, the setting of outputting an eight-sheet job allocated to each single page, and the like are displayed on the change screen.

In step S114, the CPU 11 displays, on the display screen, an output result of the job obtained if the setting value selected on the change screen is applied, and proceeds to step S116.

Exemplary embodiments are described above. The technical scope of the present disclosure is not limited to the scope of the exemplary embodiments. Various changes and improvements may be made to the exemplary embodiments without departing from the gist of the present disclosure. An embodiment, to which the changes and the improvements are added, is also encompassed in the technical scope of the present disclosure.

The exemplary embodiments do not limit the claimed disclosure. Not all the combinations of features described in the exemplary embodiments are needed for the solutions of the present disclosure. The exemplary embodiments described above include various stages of disclosure. Various disclosures are extracted from combinations of disclosed components. If one or more components are deleted from all the components described in the exemplary embodiments, the configuration, in which the one or more components are deleted, may be extracted as a disclosure as long as the effect is exerted.

For example, in the exemplary embodiments, the storage 24 included in the server 20 stores identification information of setting users, settings which are set by the setting users, and setting images associated with the settings. However, the configuration is not limited to this example. The storage 14 included in the image forming apparatus 10 may store identification information of setting users, settings which are set by the setting users, and setting images associated with the settings.

In the exemplary embodiments, when a setting user and an instruction user are the same, the CPU 11 does not display an output result of a job, which is obtained if a selected setting is applied, before output of the job. However, the configuration is not limited to this example. Even when a setting user and an instruction user are the same, an output result of a job, which is obtained if a selected setting is applied, may be displayed before output of the job.

In the exemplary embodiments, the CPU 11 displays setting images associated with settings applicable to a job. However, the configuration is not limited to this example. The CPU 11 may display settings, which are applicable to a job, in character information, or may present the settings in audio information by using a speaker or the like.

In the exemplary embodiments, the CPU 11 receives a setting image from a setting user. However, the configuration is not limited to this example. The CPU 11 may receive a setting image from a person other than a setting user, such as a manager of the image forming apparatus 10.

In the exemplary embodiments, the CPU 11 receives, from a setting user, a setting image selected from images displayed on the image selection screen. However, the configuration is not limited to this example. The CPU 11 may receive an image, which is created by a setting user themselves, as a setting image.

In the exemplary embodiments, the CPU 11 displays an output result of a job, which is obtained if a selected setting is applied, and then receives a selection as to whether the job is to be output. If a selection to output the job is received, the CPU 11 outputs the job. However, the configuration is not limited to this example. The CPU 11 does not necessarily receive a selection as to whether a job after application of a selected setting is to be output. The CPU 11 may display an output result of a job, which is obtained if a selected setting is applied, and may then output the job.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiments, the form in which the information processing program is installed in the ROM 12 or the storage 14 is described. However, the configuration is not limited to this. The information processing program according to the exemplary embodiments may be provided by storing the information processing program in a computer-readable storage medium. For example, the information processing program according to the exemplary embodiments may be provided by recording the information processing program in an optical disk, such as a compact disc (CD)-ROM or a digital versatile disc (DVD)-ROM, or in a semiconductor memory, such as a Universal Serial Bus (USB) memory or a memory card. Alternatively, the information processing program according to the exemplary embodiments may be obtained from an external apparatus through the communication OF 17.

In the exemplary embodiments, the case in which the process performed by the image forming apparatus 10 is performed by using a computer with a software configuration through execution of programs is described. The present disclosure is not limited to this. For example, the process performed by the image forming apparatus 10 may be performed by using a hardware configuration or a combination of a hardware configuration and a software configuration.

The configurations of the image forming apparatus 10 and the server 20 which are described in the exemplary embodiments are exemplary. Needles to say, unnecessary components may be deleted, and new components may be added without departing from the gist of the present disclosure.

The flows, described in the exemplary embodiments, of the processes performed by the image forming apparatus 10 (see FIGS. 4, 8, and 11) are also exemplary. Needless to say, unnecessary steps may be deleted, new steps may be added, and the processing order may be switched without departing from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:
a processor configured to:
  receive an output instruction to apply a preset setting to a job for output; and,
  when a setting user is different from an instruction user, the setting user presetting the preset setting, the instruction user transmitting the output instruction, display an output result of the job before output of the job, the output result being obtained if the preset setting is applied.

(((2)))

The information processing apparatus according to (((1))),
  wherein the processor is configured to:
  display a setting image associated with the preset setting.

(((3)))

The information processing apparatus according to (((2))),
  wherein the processor is configured to:
  receive a selection of the setting image from the instruction user; and
  display an output result of the job, the output result being obtained if the preset setting associated with the received setting image is applied.

(((4)))

The information processing apparatus according to (((2))) or (((3))),
  wherein the processor is configured to:
  receive the setting image from the setting user.

(((5)))

The information processing apparatus according to any one of (((1))) to (((4))),
  wherein the processor is configured to:
  display the output result, and then receive a selection as to whether the job is to be output.

(((6)))

The information processing apparatus according to (((5))),
  wherein the processor is configured to:
  in response to reception of a selection to output the job, output the job; and
  in response to reception of a selection not to output the job, display a message for prompting application of a preset setting different from the preset setting for the output instruction.

(((7)))

The information processing apparatus according to (((5))),
  wherein the processor is configured to:
  in response to reception of a selection to output the job, output the job; and
  in response to reception of a selection not to output the job, receive a change of a setting value of the preset setting for the output instruction.

(((8)))

An information processing program causing a computer to execute a process comprising:
  receiving an output instruction to apply a preset setting to a job for output; and,
  when a setting user is different from an instruction user, the setting user presetting the preset setting, the instruction user transmitting the output instruction, displaying an output result of the job before output of the job, the output result being obtained if the preset setting is applied.

What is claimed is:

1. An information processing apparatus comprising:
a processor configured to:
  receive an output instruction to apply a preset setting to a job for output;
  check whether a setting user presenting the preset setting is different from an instruction user transmitting the output instruction; and
  after determining that the setting user is different from the instruction user, display an output result of the job before output of the job, the output result being obtained if the preset setting is applied.

2. The information processing apparatus according to claim 1,
  wherein the processor is configured to:
  display a setting image associated with the preset setting.

3. The information processing apparatus according to claim 2,
  wherein the processor is configured to:
  receive a selection of the setting image from the instruction user; and
  display an output result of the job, the output result being obtained if the preset setting associated with the received setting image is applied.

4. The information processing apparatus according to claim 2,
  wherein the processor is configured to:
  receive the setting image from the setting user.

5. The information processing apparatus according to claim 1,
  wherein the processor is configured to:
  display the output result, and then receive a selection as to whether the job is to be output.

11

6. The information processing apparatus according to claim 5,
wherein the processor is configured to:
in response to reception of a selection to output the job, output the job; and
in response to reception of a selection not to output the job, display a message for prompting application of a preset setting different from the preset setting for the output instruction.

7. The information processing apparatus according to claim 5,
wherein the processor is configured to:
in response to reception of a selection to output the job, output the job; and
in response to reception of a selection not to output the job, receive a change of a setting value of the preset setting for the output instruction.

8. A non-transitory computer readable medium storing a program causing a computer to execute a process for information processing, the process comprising:
receiving an output instruction to apply a preset setting to a job for output;

checking whether a setting user presetting the preset setting is different from an instruction user transmitting the output instruction; and
after determining that the setting user is different from the instruction user,
displaying an output result of the job before output of the job, the output result being obtained if the preset setting is applied.

9. An information processing method comprising:
receiving an output instruction to apply a preset setting to a job for output;
checking whether a setting user presetting the preset setting is different from an instruction user transmitting the output instruction; and
after determining that the setting user is different from the instruction user,
displaying an output result of the job before output of the job, the output result being obtained if the preset setting is applied.

* * * * *